Feb. 23, 1965 L. A. MEDLAR 3,171,076
BATTERY CHARGER WITH OUTPUT VOLTAGE AUTOMATICALLY
MATCHING BATTERY RATING
Filed Sept. 13, 1961 2 Sheets-Sheet 1

CHARGER CHARACTERISTICS

BATTERY CHARACTERISTICS

INVENTOR.
LEWIS A. MEDLAR
BY
*Arnold & Roylance*

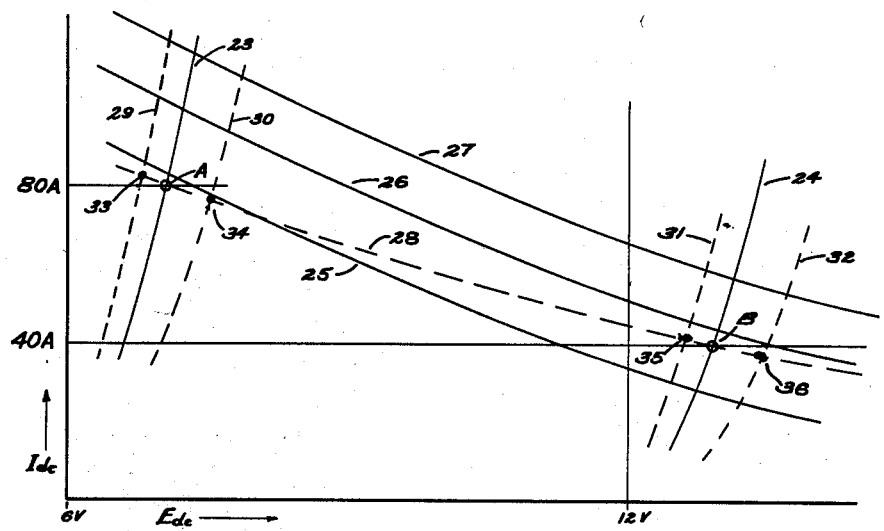
FIG_5_
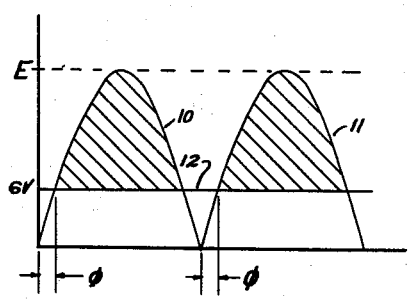
FIG_6_
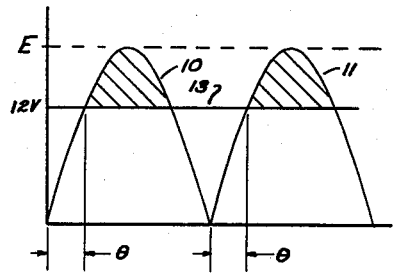
FIG_7_
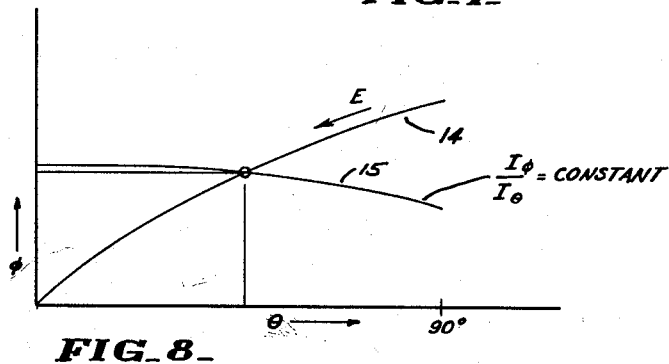
FIG_8_
INVENTOR.
LEWIS A. MEDLAR
BY Arnold & Roylance United States Patent Office 3,171,076
Patented Feb. 23, 1965

3,171,076
BATTERY CHARGER WITH OUTPUT VOLTAGE AUTOMATICALLY MATCHING BATTERY RATING
Lewis A. Medlar, Lansdale, Pa., assignor to Fox Products Company, Philadelphia, Pa., a corporation of Pennsylvania
Filed Sept. 13, 1961, Ser. No. 137,794
5 Claims. (Cl. 320—51)

This invention relates to battery chargers and more particularly to an improved transformer-rectifier apparatus which automatically provides proper charging current for batteries of two different voltage ratings.

Ever since the automobile manufacturers began producing automobiles containing 12-volt batteries, it has become necessary to provide service stations with dual-range battery chargers capable of charging the older type 6-volt batteries and the newer 12-volt batteries. The earliest such dual-range charger was effectively a double charger including two separate, independently used charging circuits connected in parallel to the output connecting cables. This type of charger was adequate at first but, because of the number of components required and the expense involved, was soon abandoned. The double charger was soon replaced by three general types of dual-range chargers which were much more economical in design. The first of these employed a transformer with a multi-tap primary winding and a switching device to selectively connect the proper tap to obtain the desired charging range. A second type of charger is of the type fully explained in my prior Patent No. 2,777,107, issued January 8, 1957, which employs a switching device to selectively connect the rectifier circuit as a full-wave bridge circuit or as a full-wave center tap circuit, thus obtaining the two different output ranges required. A third type is described in my prior Patent No. 2,980,842, issued April 18, 1961, which includes the use of two secondary windings and two rectifier circuits so that an associated switching circuit can selectively connect the two sections either in series or in parallel.

The station attendants using battery chargers usually possesses little technical skill and, when entrusted with a manually switched dual range charger, invariably forget to select the proper range. When a dual-range charger is improperly connected to a 12-volt battery, no charging takes place, but when connected improperly to a 6-volt battery can result in an excessive flow of charging current, often sufficient to cause permanent damage to the charger and battery. As a result, automatic switching circuits were found to be necessary. The most common type of automatic switching circuit presently employed includes a voltage sensitive relay connectable across the battery terminals so that, when a battery terminal potential in excess of approximately 8 volts is present, the switching circuit automatically switches to the 12-volt battery range. This switching relay has become one of the largest sources of problems in the dual range chargers since the relay must be capable of interrupting either 100 amps charging current or 20 amps line current. Relays capable of interrupting currents of this magnitude are of limited life because of high current arcing across the contacts and because of the short life inherent in mechanically moving devices. Often, the failure of this relay results in extensive damage to the charger and battery being charged.

From the history of the dual range charger, it becomes apparent that an automatic battery charger of this type which does not depend on mechanical switches or electromagnetic relays for its operation is urgently needed. It is therefore a general object of this invention to provide such a dual range battery charger.

It is another object to provide a dual-range charger which employs no relays and is capable of providing a high current quick charge for 6- and 12-volt automobile lead plate batteries.

It is still another object of this invention to provide a more economical dual-range charger employing a positive temperature coefficient impedance in the primary input circuit to the charger.

In order that the manner in which these and other objects are attained in accordance with the invention can be understood in detail, reference is had to the accompanying drawings, which form a part of this specification, and wherein:

FIG. 5 is a diagram showing battery charger characteristic curves superposed upon battery characteristic curves;

FIG. 6 is a diagram showing the relationship between the full-wave charging potential and the normal terminal potential of a 6-volt battery;

FIG. 7 is a diagram showing the relationship between the full-wave charging potential and the no-load terminal potential of a 12-volt battery; and FIG. 8 is a diagram showing curves employed in determining the proper driving voltage value for a dual-range battery charger.

Figure 1:
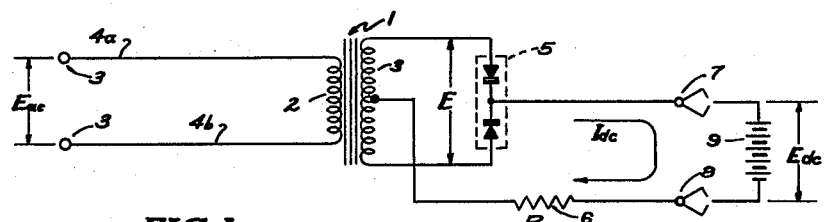
FIG. 1 is a schematic diagram of a battery charger in accordance with one embodiment of this invention.

Conventional battery chargers generally employ a transformer and a full-wave rectifier combination. The driving voltage of such a unit is defined as the transformer's no-load secondary voltage and the charging current is defined as the current flowing from the rectifier to the battery being charged. The normal battery voltage is the potential developed by the electrochemical action of the battery and may be measured across the battery terminals provided the load across the battery is insignificant. When a battery is properly connected for charging, the normal battery voltage opposes the charger potential and therefore charging current flows only during the portion of the half-cycle when the instantaneous value of the driving voltage exceeds the normal battery charge. The quantity of current flow depends upon the potential difference between the instantaneous driving voltage and the normal battery voltage.

In a duel-range battery charger, it is essential to have the proper ratio of charging current for the two different types of batteries which, as would be expected, is approximately equal to the inverse of the battery voltage ratings. As will be pointed out later, this is not exactly true, but at this point it may be assumed that, for example, a 6-volt battery should be charged with approximately twice the charging current as would be employed for a 12-volt battery of similar watt-hour capacity. Since batteries are generally rated by their ampere-hour capacity, it may be more helpful to state, as a rough rule, that the desired charge rate is directly proportional to the ampere-hour rating of the battery, the ampere-hour rating of a 6-volt battery being roughly twice that of a 12-volt battery. In the past, the dual-range chargers have employed a voltage sensitive relay to change the driving voltage to achieve this desired current ratio. The battery charger constructed in accordance with this invention employs no such switching circuit but instead is based on the discovery that there is a single unique driving voltage which gives the desired current ratio for batteries of two different voltage ratings.

The reason that a single driving voltage does this is not readily apparent and therefore a very over-simplified explanation is presented at the outset, followed by a more exacting detailed explanation. Assume, for example, that a battery charger is being designed to charge 6- and 12-volt batteries and that therefore a 2:1 current ratio is desired. If a driving voltage having a peak value of 13 volts is employed, the current ratio would be much higher than desired, at least 7:1 (the current ratio is 7:1 if, for simplicity, it is assumed that charging current is directly proportional to the difference between the peak driving voltage and the normal battery voltage). If the magnitude of the driving voltage is increased to have a peak value of 14 volts, the charging current for the 12-volt battery is increased 50% (since the peak driving voltage is increased from 1 volt above the normal battery potential to 2 volts) and that for the 6-volt battery is increased only 12.5% (since the peak driving voltage has increased from 7 volts above the normal 6-volt battery voltage to 8 volts above) and the current ratio is therefore reduced to 4:1. As the driving voltage is increased further, the current ratio decreases until an infinite driving voltage is used resulting in current ratio of 1:1. Therefore, by properly selecting the driving voltage, it is theoretically possible to obtain the desired current ratio.

The driving voltage corresponding to the desired current ratio usually results in too high a charging current for either a 6- or 12-volt battery. The charging currents must therefore be reduced and in a manner which does not disturb the current ratio. One way of doing this is to insert an ordinary current limiting impedance into the circuit as ballast resistance which has the effect of reducing the charging current for both the 6- and 12-volt batteries proportionately, thus leaving the ratio undisturbed. In some instances, it is found desirable to employ a non-linear impedance which tends to disturb the ratio in a desirable direction. An impedance having a positive temperature coefficient of resistance has such an effect and permits use of a lower driving voltage.

A circuit employed in accordance with this invention is shown in FIG. 1 and includes a transformer 1 having a primary winding 2 and a center-tapped secondary winding 3. The ends of primary winding 2 are connected to terminals 3 via conductors 4a and 4b, the terminals being connectable to an alternating current source $E_{ac}$. Conductors 4a and 4b often have a maximum permissible line current and the charger must be designed not to exceed this value. A center-tapped rectifier 5 is connected across the entire secondary winding 3. The center tap of rectifier 5 is connected to clamp 7 and the center tap of secondary winding 3 is connected to clamp 8 via resistance 6 having a resistance value R. Clamps 7 and 8 are advantageously of the pivoted jaw type dimensioned to engage the terminals of a battery 9 being charged.

The turns ratio between primary winding 2 and secondary winding 3 is carefully selected so that a specific no-load driving voltage E appears across the secondary winding whenever the primary winding is connected to an alternating current source $E_{ac}$ of the proper magnitude. The driving voltage is the no-load voltage and appears across the secondary winding only when clamps 7 and 8 are disconnected from the battery terminals. Charging current $I_{dc}$ flows through the battery whenever the instantaneous value of the driving voltage E exceeds the normal battery voltage $E_b$. Whenever charging current flows through the battery an additional potential drop is developed across the battery and therefore the battery terminal potential increases to a value $E_{dc}$. The correct value of driving voltage E necessary to obtain the desired current ratio must be precisely determined. One method of determining the value of the driving voltage is set out and explained with reference to FIGS. 6, 7 and 8.

In FIG. 6, the curves 10 and 11 represent the full-wave rectified potential appearing at the output of the battery charger's full-wave rectifier (between clamps 7 and 8 if no load is connected), these curves having a peak value equal to the peak value of the driving voltage E. When the clamps 7 and 8 are connected to a 6-volt battery, charging takes place only during the shaded portion of the curve when the driving voltage exceeds the normal 6-volt battery voltage represented by horizontal line 12. Since the charging current is proportional to the difference between the battery terminal voltage and the driving voltage, the area of the shaded portion is proportional to the charging current. At the beginning of each half-cycle, there is a certain time duration during which no charging takes place and this time interval is designated as the firing angle $\phi$ measured in electrical degrees.

In FIG. 7, the relationship between the same full-wave rectified potential is shown with respect to the normal battery voltage of a 12-volt battery represented by horizontal line 13. In this instance the firing angle is increased to a value $\theta$.

It should be noted that the battery terminal voltage deviates from the normal battery voltage value during charging. It is well known that storage batteries exhibit the phenomenon of polarization or overvoltage which is too complicated to be gone into in detail. Reference is made to the text by Dr. G. W. Vinal entitled Storage Batteries, 4th Edition, 1955, published by John Wiley and Sons, Inc., for a complete discussion of this phenomenon. Simply stated, however, polarization relates to a build-up of charged particles which act as small battery cells on the battery plates which is caused by the charging current through the battery. These polarization cells provide a potential at the battery terminals which is additive and therefore increases the battery terminal potential during charging. The amount of battery terminal voltage increase depends on the type of battery being charged and can easily be determined experimentally. Accordingly, the horizontal lines 12 and 13, in FIGS. 6 and 7, respectively, should be positioned somewhat higher than shown, but for simplicity, the 6- and 12-volt values will be assumed.

As the value of the driving voltage E is changed, the values of the firing angles $\phi$ and $\theta$ change correspondingly. Thus, the corresponding values of $\phi$ and $\theta$ may be plotted for various different values of driving voltage and plotted as shown in FIG. 8 curve 14.

For any particular driving voltage E, the area of the shaded portion in FIG. 6 has a certain value and a corresponding firing angle $\phi$. For the same value of driving voltage the area of the shaded portion in FIG. 7 has a certain value and a corresponding firing angle $\theta$. Since the areas of the shaded portions are proportional to the charging current, the ratio of these areas is effectively the same as the ratios of the two charging currents. Accordingly, curve 15 in FIG. 8 may be plotted showing the relationship between $\phi$ and $\theta$ for a particular current ratio. Points along this curve may be obtained, for example, by selecting a value of $\phi$, varying the driving voltage until the shaded portion areas correspond to the selected current ratio, and from these figures finding the corresponding value of $\theta$.

The intersection of curves 14 and 15 gives the corresponding values of $\phi$ and $\theta$ for the one and only driving voltage capable of giving the desired current ratio for a particular pair of different voltage rating batteries, in this case 6 and 12 volts. From these particular values of $\phi$ and $\theta$ the associated driving voltage is easily calculated and this is the proper driving voltage E for the battery charger shown in FIG. 1.

The value of driving voltage derived generally results in a charging current much higher than would normally be permissible. The value of the charging current is therefore reduced without disturbing the charging current ratio by inserting a ballast resistance 6 of a suitable magnitude R. Another method of calculating the proper value of driving voltage is set out and explained with regard to FIGS. 3, 4 and 5.

Figure 3:
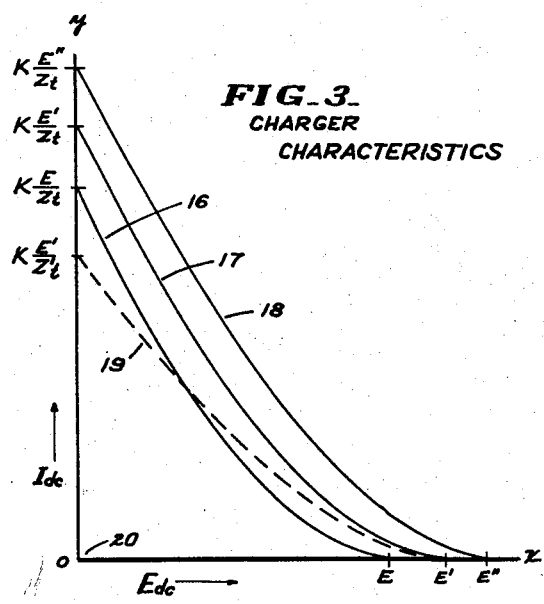
FIG. 3 is a diagram showing several charging current vs. battery terminal voltage curves for a battery charger.

The characteristics of a battery charger can be described in terms of curves between $E_{dc}$ and $I_{dc}$ as shown in FIG. 3. The $E_{dc}I_{dc}$ curve for a particular charger intercepts the abscissa, or X axis, at a value of $E_{dc}$ equal to the peak driving voltage, hence corresponding to the condition where a battery of infinite impedance is connected to the charger permitting effectively the entire instantaneous value of the driving voltage to be developed across the battery. The point at which the same curve intercepts the ordinate, or Y axis, is when $E_{dc}$ is equal to zero, which occurs when a battery having essentially zero internal impedance is connected to the charger and current flow through the battery is limited only by the resistance in the charger circuit. Thus, the Y intercept is equal to a constant times the driving voltage E divided by the circuit impedance, which would be effectively the resistance value R of resistance 6 and the forward impedance of diodes 5.

If the charger circuit impedance is equal to a value $Z_t$ and the driving voltage is of a magnitude E, a characteristic curve 16, shown in FIG. 3, results. If the circuit resistance remains the same and the driving voltage is raised to a value E', a characteristic curve 17 results. Similarly, if the driving voltage is raised to a value E'', the characteristic curve 18 results. The characteristic curves 16, 17 and 18 are essentially parallel curves, since both the X and Y intercepts are directly proportional to the driving voltage magnitude. A complete family of parallel characteristic curves could be drawn, the individual curves having a distance from the zero point 20 depending upon the driving voltage.

Since only the Y intercept is dependent upon the circuit resistance, changes in the circuit resistance have a tendency to change the slope of the curve. Thus, for a driving voltage E' and an increased circuit resistance $Z'_t$, as could be brought about by increasing the value of resistance 6 in FIG. 1, results in the curve 19. In short, it may be stated that the distance of the characteristic $E_{dc}I_{dc}$ curve from the zero point is determined primarily by the driving voltage and the slope of the curve is determined primarily by the circuit resistance.

Figure 4:
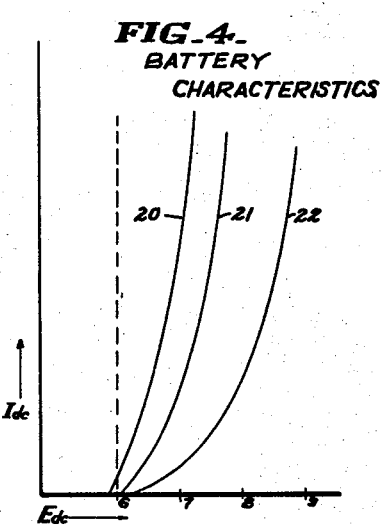
FIG. 4 is a diagram showing several charging current vs. battery terminal voltage curves for a battery.

The characteristics of a battery while being charged is dependent primarily upon the battery's internal resistance, the internal resistance in turn being a function of the battery temperature and the state of charge. These characteristics may be determined experimentally or from manufacturers' data, but in most instances are basically as shown in FIG. 4 as shown for a 6-volt battery. Curve 20 represents the $E_{dc}I_{dc}$ curve for an absolutely flat battery at a temperature of 100° F. Curve 21 is the $E_{dc}I_{dc}$ curve for the same battery when 50% charged and at approximately 80° F. Curve 22 is the curve for the same battery when fully charged at a temperature of 20° F.

It the battery characteristic curve is superposed upon the charger characteristic curve, the intersection of these curves is the point at which a particular battery charger will charge a particular battery. Such superposed curves are shown in FIG. 5 and are used determine the correct value of driving voltage and circuit resistance which permits charging a 6- and 12-volt battery from the same circuit with the proper current ratio. Only the essential portions of the charger and battery characteristic curves are shown in FIG. 5.

Assume that it is desirable to design a battery charger capable of charging both a 6- and 12-volt battery, a half-charged 12-volt battery at the rate of 40 amps and a half-charged 6-volt battery at the rate of 80 amps. Accordingly, the battery characteristic curve 23 for a 50% charged 6-volt battery is plotted and the point A corresponding to the 80 amp $I_{dc}$ value is marked. Similarly, the curve 24, representing the characteristics of a 50% charged 12-volt battery is plotted and point B corresponding to the 40 amp $I_{dc}$ value is marked. The battery charger which will charge the 6- and 12-volt batteries as desired has a characteristic curve passing through points A and B. This battery charger can be determined by the trial-and-error method consisting of plotting the various characteristic battery charger $E_{dc}I_{dc}$ curves until one is found passing through both of these points.

A family of curves such as 25, 26 and 27 is plotted for the same value of circuit resistance and different values of driving voltage. It is obvious that these curves have too much slope and therefore curve 28 is drawn for a higher value of circuit resistance and approximately the same driving voltage as was employed to obtain curve 27 having a lesser slope. This procedure continues until a curve is found passing through points A and B. The curves 29–31 representing the high and low $E_{dc}I_{dc}$ curves for 6- and 12-volt batteries may then be plotted to determine the maximum and minimum charging current values 33–36 which can result. Thus, by plotting the curves shown in FIG. 5, the particular value of driving voltage and circuit resistance to obtain the current ratio of 80:40 is determined.

The charging current ratio need not be 2:1 as assumed in the previous examples but can be of any desired value. In actual practice, it is found that the storage capacity of a 12-volt lead plate automobile battery is somewhat less than that of a 6-volt battery and therefore a current ratio of 65:35 is found somewhat more desirable. Battery chargers for automobile batteries are therefore usually designed for this current ratio.

Figure 2:
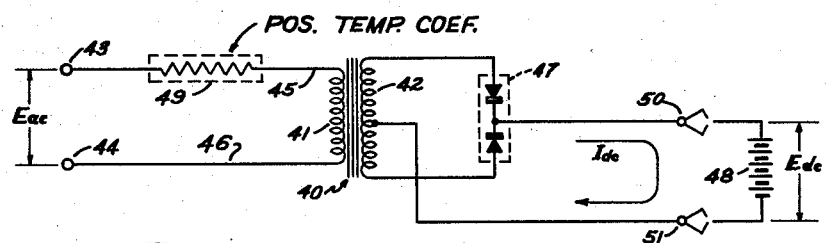
FIG. 2 is a schematic diagram of a battery charger in accordance with a second embodiment.

Another construction for a battery charger in accordance with this invention is shown in FIG. 2 and includes a transformer 40 having a primary winding 41 and a center-tapped secondary winding 42. Primary winding 41 is connected to terminals 43 and 44 via leads 45 and 46 respectively. Terminals 43 and 44 are connectable to a suitable alternating current source of potential $E_{ac}$. A center-tapped rectifier 47 is connected across the entire secondary winding 42. The center tap of rectifier 47 is connected to a clamp member 50 and the center tap of secondary winding 42 is connected to a clamp 51. The clamps 40 and 51 are dimensioned to engage the battery terminals of a battery 48 to be charged.

Instead of inserting the ballast resistance in the circuit associated with the secondary winding of the transformer, as is done in FIG. 1, the equivalent ballast resistance is connected in the circuit of the transformer primary winding. Ballast resistance 49, connected to the primary winding 41, has an increased resistance value which is increased by a factor of the transformer turns ratio squared and therefore has the identical effect on the battery charger as would the lower value ballast resistance in the circuit of the secondary winding. The advantage in placing the ballast resistance in the primary winding circuit is that this arrangement permits the use of a smaller transformer, since it is not necessary to pass power through the transformer to supply the heat loss of the ballast resistance.

The ballast resistance 49 is of the type displaying positive temperature coefficient characteristics so that as the current flows the resistance value increases. When selecting the battery charger driving voltage it is the charging current for the higher voltage rating battery which presents the difficulties or in other words the value of driving voltage must be increased until the charging current for the higher voltage rating battery comes up sufficiently to obtain the desired current ratio. Therefore, if a ballast resistance is employed which offers a higher resistance to current flow while charging the lower voltage rating battery it is possible to obtain the desired current ratio for the batteries with a lower driving voltage. The obvious advantage of a lower driving voltage is a reduction in the size of the required ballast resistance and associated heat loss.

In order to enable anyone to construct a battery charger in accordance with the most advantageous embodiment of this invention, the precise values of circuit components for a commercially rated 100 amp-50 amp 6–12 volt battery charger will be given. From the foregoing specification, it is obvious that the dominant parameter of the circuit for a given current ratio and battery voltages is the circuit driving voltage. For the charger specified, this no-load driving voltage is 16.3 volts R.M.S. The design procedure for a transformer to obtain such a voltage from the available source voltage and to carry the necessary currents is well known to those skilled in the art, and may be either for a bridge or center-tapped rectifier as may be preferred. The rectifiers may be any type suited for the voltage and current load. The resistor is wound either of commercially pure nickel wire, or a nickel-iron alloy of substantially the same temperature coefficient of resistance as pure nickel but of substantially lower cost. One form of this latter alloy is known by the trade name of HYTEMCO, and is a product of the Driver-harris Co. of Newark, New Jersey. #16 ga. size is a quite suitable size, although this is not critical.

The length of wire required to obtain the proper circuit resistance is not easily specified. The circuit resistance includes such miscellaneous resistances as the diode forward resistance, the lead wire resistance, and the transformer resistance, in addition to the ballast resistance. Since the circuits in the charger are of the low resistance, high current type, small changes in resistance have a considerable effect on the operation. Another problem with specifying the wire length is that the resistance value obtained with a certain length of wire changes drastically in accordance with the dissipation of heat into a cooling air stream. Therefore, as a practical matter, it is found best to assemble an entire battery charger containing a ballast resistance of more than sufficient wire wound on a form. The charger is then placed in operation. When the temperatures have stabilized, the length of resistance wire is adjusted to give the correct output. In this manner, all the variables are automatically compensated for to achieve proper operation.

While only the most advantageous embodiments of the present invention have been shown, particularly as applicable to 6- and 12-volt automobile batteries, it is obvious to one skilled in the art that it is possible to construct a battery charger operable with any pair of different batteries within the scope of the present invention. The invention is pointed out more specifically in the appended claims.

What is claimed is:

1. In a battery charger for charging batteries of two different known voltage ratings and being operative to automatically provide charging current of the proper magnitude for the different batteries, the combination of a transformer having a primary and a secondary winding; first circuit means for connecting said primary winding to an A.C. source providing potential of a predetermined magnitude, said first circuit means and said transformer being of limited current carrying capacity; the turns ratio between said primary winding and said secondary winding being such that a precisely predetermined no-load driving voltage appears across said secondary winding when said primary winding is energized from the A.C. source; rectifying means connected across said secondary winding to rectify said driving voltage; second circuit means for connecting said rectifying means to the battery being charged to provide a path for battery charging current; said driving voltage being that precisely predetermined potential operative to provide a predetermined ratio between charging current of the lower voltage rating batteries and the charging current of the higher voltage rating batteries which is approximately equal to the inverse of the ratio between the voltage ratings; and ballast impedance means connected in series with said primary winding to limit current to a value which can be supplied via said first circuit means and said transformer.

2. A battery charger in accordance with claim 1 wherein said ballast impedance means is a positive temperature coefficient resistance.

3. In a battery charger for charging batteries of two different known voltage ratings and being operative to automatically provide charging current of the proper magnitude for the different batteries, the combination of a transformer having a primary and a secondary winding; first circuit means for connecting said primary winding to an A.C. source providing potential of a predetermined magnitude, said first circuit means and said transformer being of limited current carrying capacity; the turns ratio between said primary winding and said secondary winding being such that a precisely predetermined no-load driving voltage appears across said secondary winding when said primary winding is energized from the A.C. source; rectifying means connected across said secondary winding to rectify said driving voltage; second circuit means for connecting said rectifying means to the battery being charged to provide a path for battery charging current; said driving voltage being that precisely predetermined potential operative to provide a predetermined ratio between charging current of the lower voltage rating batteries and the charging current of the higher voltage rating batteries; and positive temperature coefficient impedance means connected in series with said primary winding to limit current to a value which can be supplied via said first circuit means and said transformer, said impedance being operative to provide a higher resistance to current flow when charging a battery of the lower voltage rating and a lower resistance to current flow when charging a battery of the higher voltage rating.

4. In a battery charger for charging batteries of two different known voltage ratings, and operative to automatically provide the proper charging current for the different batteries, the combination of a battery charging circuit comprising a transformer having a primary and secondary winding, said primary winding being connectable to a source of A.C. potential of a predetermined value, the turns ratio between said secondary and said primary winding being such that the no-load driving voltage produced across said secondary winding is of a single precisely predetermined value; rectifying means operatively connected to said secondary winding to rectify said driving voltage; circuit means for connecting said rectifying means to the battery being charged to provide a path for charging current; the value of said precisely predetermined driving voltage being that one potential which provides a predetermined ratio between charging current for batteries of the lower voltage rating and charging current for batteries of the higher voltage rating; and a positive temperature coefficient resistance connected in series with said primary winding to limit the current flow in said charging circuit to below a certain predetermined value.

5. In a battery charger for charging batteries of two different known voltage ratings, and operative to automatically provide the proper charging current for the different batteries, the combination of a battery charging circuit comprising a transformer having a primary and secondary winding, said primary winding being connectable to a source of A.C. potential of a predetermined value, the turns ratio between said secondary and said primary winding being such that the no-load driving voltage produced across said secondary winding is of a single precisely predetermined value; rectifying means operatively connected to said secondary winding to rectify said driving voltage; circuit means for connecting said rectifying means to the battery being charged to provide a path for charging current; the value of said precisely predetermined driving voltage being that one potential which provides a predetermined ratio between charging current for batteries of the lower voltage rating and charging current for batteries of the higher voltage rating; and a positive temperature coefficient resistance serially connected in said charging circuit to limit the current flow in said charging circuit to below a certain predetermined value.

References Cited by the Examiner

UNITED STATES PATENTS

| | | | |
|---|---|---|---|
| 2,456,978 | 12/48 | Medlar | 320—59 X |
| 2,977,525 | 3/61 | Medlar | 320—19 |

FOREIGN PATENTS 289,939   5/28   Great Britain.

OTHER REFERENCES

Harvey: Battery Chargers and Charging, London, Clliffe & Sons, 1953, pages 107 to 109.

LLOYD McCOLLUM, *Primary Examiner.*